(12) United States Patent
Luten et al.

(10) Patent No.: US 12,376,198 B2
(45) Date of Patent: *Jul. 29, 2025

(54) ANTI-CONDENSATION ASSEMBLY

(71) Applicant: Gentex Corporation, Zeeland, MI (US)

(72) Inventors: Henry A. Luten, Zeeland, MI (US); David I. Driscoll, Caledonia, MI (US); Steven J. Veenman, Hudsonville, MI (US); Kevin L. Ash, Grand Rapids, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/637,753

(22) Filed: Apr. 17, 2024

(65) Prior Publication Data

US 2024/0276607 A1    Aug. 15, 2024

Related U.S. Application Data

(63) Continuation of application No. 17/065,769, filed on Oct. 8, 2020, now Pat. No. 11,979,951.

(60) Provisional application No. 63/005,562, filed on Apr. 6, 2020, provisional application No. 62/913,510, filed on Oct. 10, 2019.

(51) Int. Cl.
| | |
|---|---|
| *H05B 3/86* | (2006.01) |
| *B64C 1/14* | (2006.01) |
| *G02F 1/153* | (2006.01) |
| *H05B 1/02* | (2006.01) |

(52) U.S. Cl.
CPC ............. *H05B 3/86* (2013.01); *B64C 1/1484* (2013.01); *B64C 1/1492* (2013.01); *G02F 1/1533* (2013.01); *H05B 1/0236* (2013.01); *H05B 2203/013* (2013.01)

(58) Field of Classification Search
CPC .. H05B 3/86; H05B 1/0236; H05B 2203/013; H05B 3/84; B64C 1/1484; B64C 1/1492; G02F 1/1533; G02F 1/163
USPC ......................................................... 359/275
See application file for complete search history.

(56) References Cited

U.S. PATENT DOCUMENTS

| | | | |
|---|---|---|---|
| 5,852,284 A | 12/1998 | Teder et al. | |
| 5,965,853 A | * 10/1999 | Hornsey | .......... B32B 17/10137 |
| | | | 181/290 |
| 6,561,460 B2 | 5/2003 | Rukavina et al. | |
| 6,783,099 B2 | 8/2004 | Rukavina et al. | |
| 8,736,943 B2 | 5/2014 | Guarr et al. | |
| 8,885,242 B2 | 11/2014 | Guarr et al. | |

(Continued)

*Primary Examiner* — Mohammed A Hasan
(74) *Attorney, Agent, or Firm* — Price Heneveld LLP; Brian James Brewer

(57) ABSTRACT

A window operable to separate an interior from an exterior is disclosed. The window comprises a pressure pane and an anti-condensation assembly. The anti-condensation assembly is disposed in an interior direction relative the pressure pane. Further, the anti-condensation assembly comprises a substantially transparent substrate disposed in a spaced apart relationship relative the pressure pane. Additionally, the anti-condensation assembly comprises a resistively heatable layer associated with the first substrate. The resistively heatable layer is operable to generate heat when an electrical current is applied thereto. Accordingly, application of power to the resistively heatable layer may serve to reduce or eliminate the presence of visible condensation in the window.

20 Claims, 7 Drawing Sheets

(56) References Cited

U.S. PATENT DOCUMENTS

| | | |
|---|---|---|
| 9,146,437 B2 | 9/2015 | Driscoll et al. |
| 9,403,590 B2 | 8/2016 | Driscoll et al. |
| 9,829,763 B2 | 11/2017 | Friedman et al. |
| 9,986,669 B2 | 5/2018 | Uprety et al. |
| 11,979,951 B2* | 5/2024 | Luten .................... B64C 1/1484 |
| 2007/0285759 A1* | 12/2007 | Ash .......................... B60J 3/04 |
| | | 359/275 |
| 2008/0029078 A1 | 2/2008 | Baumann et al. |
| 2013/0216784 A1* | 8/2013 | Zhang ................... B08B 17/065 |
| | | 428/141 |
| 2016/0085129 A1 | 3/2016 | Cammenga et al. |
| 2016/0104806 A1* | 4/2016 | Thrush ................... G01N 21/15 |
| | | 257/434 |
| 2016/0266458 A1* | 9/2016 | Geerlings .......... B23K 26/0006 |

* cited by examiner

ANTI-CONDENSATION ASSEMBLY

CROSS-REFERENCE TO RELATED APPLICATIONS

This application is a continuation of U.S. patent application Ser. No. 17/065,769 filed on Oct. 8, 2020, entitled "ANTI-CONDENSATION ASSEMBLY," now U.S. Pat. No. 11,979,951, which claims priority under U.S.C. § 119 (e) to U.S. Provisional Application No. 63/005,562 filed on Apr. 6, 2020, entitled "ANTI-FOG ASSEMBLY," and U.S. Provisional Application No. 62/913,510 filed on Oct. 10, 2019, entitled "ANTI-FOG ASSEMBLY," the disclosures of which are hereby incorporated by reference in their entireties.

FIELD OF INVENTION

The present disclosure relates to an aircraft window assembly, and more specifically, to a an aircraft window assembly that inhibits visible condensation.

BACKGROUND OF INVENTION

Pressure panes are a normal component of high-flying aircraft to serve to maintain acceptable pressure levels within the passenger compartment. However, aircraft pressure panes often have issues with condensation buildup on their inner surface due to the cold exterior air at higher altitudes. Sometimes, the visible condensation may present itself as frost. This inner surface is a condensing surface. A condensing surface is often the outermost surface exposed to the aircraft interior's atmosphere. The condensation buildup is due to the temperature differential between that atmosphere on the inside of the pressure pane (the atmosphere inside of the aircraft) and the atmosphere outside of the pressure pane (the atmosphere outside the aircraft). The cold atmosphere outside the pressure pane causes the pressure pane to cool and therefore encourage visible condensation, from the warm atmosphere inside, to form thereon. Accordingly, there is a need for an improved aircraft window that prevents visible condensation buildup while using lower energy levels and thus less heat generation.

SUMMARY

In accordance with the present disclosure, the disadvantages and problems associated with reducing or eliminating visible condensation buildup on an interior of an aircraft pressure pane have been substantially reduced or eliminated.

In accordance with one aspect of the present disclosure, a window operable to separate an interior from an exterior is disclosed. The window may be an aerospace window. Further, the window may comprise a pressure pane and an anti-condensation assembly. The pressure pane may be substantially transparent and have a first surface and a second surface. The first surface may be disposed in an exterior direction relative the second surface. The anti-condensation assembly may be disposed in an interior direction relative the pressure pane. Further, the anti-condensation assembly may comprise a first substrate, a first seal, and a resistively heatable layer. The first substrate may be substantially transparent and have a third surface and a fourth surface. The third surface may be disposed in the exterior direction relative the fourth surface. Further, the first substrate may be disposed in a spaced apart relationship with the pressure pane. Accordingly, the first substrate may be spaced less than 20, 15, 10, 9, 8, 7, 6, 5, 4, 3, 2, or 1 mm from the pressure pane. The first seal may be disposed in a peripheral manner between the pressure pane and the first substrate. Further, the first seal may define, at least in part, a first chamber and be operable to restrict and/or inhibit air and moisture from freely entering the first chamber. In some embodiments, the first chamber may be filled with an insulating gas other than air. The resistively heatable layer may be associated with the first substrate. Additionally, the resistively heatable layer operable to dissipate thermal energy when an electrical current is applied thereto. In some embodiments, the resistively heatable layer may be associated with the fourth surface. In other embodiments, the resistively heatable layer may be associated with the third surface. In some embodiments, the resistively heatable layer may be configured to selectively heat a region only partly occluding a viewing region of the window.

In some embodiments, the window may further comprise a variably transmissive electro-optic element disposed in the interior direction relative the anti-condensation assembly. The electro-optic element may comprise a second substrate, a third substrate, an electro-optic medium, a first electrode, and a second electrode. The second and third substrates may each be substantially transparent. The second substrate may have fifth and sixth surfaces. The fifth surface may be disposed in the exterior direction relative the sixth surface. The third substrate may have seventh and eighth surfaces. The seventh surface may be disposed in the exterior direction relative the eighth surface. Additionally, the third substrate may be disposed in the interior direction and in a spaced apart relationship relative the second substrate. An electro-optic medium may be disposed between the second substrate and the third substrate. The first and second electrodes may be associated with the sixth and seventh surfaces, respectively.

In some embodiments, the electro-optic element may be further disposed in a spaced apart relationship relative the anti-condensation assembly. In such an embodiment, resistively heatable layer is operable to inhibit or prevent visible condensation buildup on at least one of the first substrate and the resistively heatable layer with a power of less than about 500, 400, 350, 300, 250, 200, 150, 100, 50, or 25 watts per square meter of resistively heatable layer applied to the resistively heatable layer. Additionally, a hydrophilic layer may be associated with the fourth surface.

In other embodiments, the fifth surface may be associated with the fourth surface. The association may be by direct abutting contact by each of these surfaces with the resistively heatable layer. In such an embodiment, resistively heatable layer is operable to inhibit visible condensation buildup on the eighth surface with a power of less than about 500, 400, 350, 300, 250, 200, 150, 100, 50, or 25 watts per square meter of resistively heatable layer applied to the resistively heatable layer.

In some embodiments, the window may further comprise a film associated with the third surface. The film may have a high emissivity. Accordingly, the film may have an emissivity greater than greater than or equal to about 0.5, 0.6, 0.7, 0.8, 0.9, or 1.0.

In some embodiments, the window may further comprise a temperature sensor. The temperature sensor may be operable to take a measurement of the temperature of the first chamber, the resistively heatable layer and/or the second surface. Further, in such an embodiment, a power applied to the resistively heatable layer may be determined based, at least in part, on the measurement.

According to another aspect of the present disclosure, a window operable to separate an interior from an exterior is disclosed. The window may be an aerospace window. Further, the window may comprise a pressure pane, an electro-optic element, a first seal, and a resistively heatable material. The electro-optic element may be variably transmissive. Additionally, the electro-optic element may be disposed in an interior direction and in a spaced apart relationship relative the pressure pane. Further, the electro-optic element may be spaced less than 20, 15, 10, 9, 8, 7, 6, 5, 4, 3, 2, or 1 mm from the pressure pane. The electro-optic element may comprise a first substrate, a second substrate, a first electrode, a second electrode, and an electro-optic medium. The first substrate may have a first surface and a second surface. The first surface may be disposed in an exterior direction relative the second surface. The second substrate may have a third surface and a fourth surface. The third surface may be disposed in an exterior direction relative the fourth surface. Additionally, the second substrate may be disposed in the interior direction and in a spaced apart relationship relative the first substrate. The first and second electrodes may be associated with the second and third surfaces, respectively. The electro-optic medium may be disposed between the first and second electrodes. The first seal may be disposed between the pressure pane and the electro-optic element. Further, the first seal may be operable to seal a chamber defined, at least in part, by the first seal, the pressure pane, and the electro-optic element. In some embodiments, the chamber may be filled with an insulating gas other than air. The resistively heatable material may be associated with the fourth surface. Additionally, the resistively heatable layer may be operable to inhibit or prevent visible condensation buildup on the fourth surface with a power of less than about 500, 400, 350, 300, 250, 200, 150, 100, 50, or 25 watts per square meter of resistively heatable layer applied to the resistively heatable layer. In some embodiments, the resistively heatable layer may be configured to selectively heat a region only partly occluding a viewing region of the window.

In some embodiments, the window may further comprise a hydrophilic layer. The hydrophilic layer may be associated with the resistively heatable material.

In some embodiments, the window may further comprise a film. The film may be associated with the first surface. The film may have a high emissivity. Accordingly, the film may have an emissivity greater than greater than or equal to about 0.5, 0.6, 0.7, 0.8, 0.9, or 1.0.

In some embodiments, the window may further comprise a dust cover. The dust cover may be disposed interior and in a spaced apart relationship relative the electro-optic element. Additionally, the dust cover may comprise a mechanical shade.

In some embodiments, the window may further comprise a temperature sensor. The temperature sensor may be operable to take a measurement of the temperature of the first chamber, the resistively heatable layer, and/or the pressure pane. Further, in such an embodiment, a power applied to the resistively heatable layer may be determined based, at least in part, on the measurement.

According to yet another aspect of the present disclosure, a window operable to separate an interior from an exterior is disclosed. The window may be an aerospace window. Further, the window may comprise a pressure pane, an electro-optic element, a first seal, and an anti-condensation assembly. The pressure pane may be substantially transparent. The electro-optic element may be variably transmissive. Additionally, the electro-optic element may be disposed in an interior direction and in a spaced apart relationship relative the pressure pane. Further, the electro-optic element may be spaced less than 20, 15, 10, 9, 8, 7, 6, 5, 4, 3, 2, or 1 mm from the pressure pane. The electro-optic element may comprise a first substrate, a second substrate, a first electrode, a second electrode, and an electro-optic medium. The first substrate may have a first surface and a second surface. The first surface may be disposed in an exterior direction relative the second surface. The second substrate may have a third surface and a fourth surface. The third surface may be disposed in an exterior direction relative the fourth surface. Additionally, the second substrate may be disposed in the interior direction and in a spaced apart relationship relative the first substrate. The first and second electrodes may be associated with the second and third surfaces, respectively. The electro-optic medium may be disposed between the first and second electrodes. The first seal may be disposed between the pressure pane and the electro-optic element. Further, the first seal may be operable to seal a chamber defined, at least in part, by the first seal, the pressure pane, and the electro-optic element. In some embodiments, the chamber may be filled with an insulating gas other than air. The anti-condensation assembly may be disposed in an interior direction and in a spaced apart relationship relative the electro-optic element. Further, the anti-condensation assembly may comprise a third substrate, a second seal, and a resistively heatable layer. The third substrate may have a fifth surface and a sixth surface. The fifth surface may be disposed in the exterior direction relative the sixth surface. Additionally, the first substrate may be disposed in a spaced apart relationship with the second substrate. The second seal may be disposed in a peripheral manner between the third substrate and the second substrate. Further, the second seal may define, at least in part, a second chamber and operable to restrict and/or inhibit air and moisture from freely entering the second chamber. In some embodiments, the second chamber may be filled with an insulating gas other than air. The resistively heatable layer may be associated with the third substrate. Additionally, the resistively heatable layer may be operable to dissipate thermal energy when an electrical current is applied thereto. In some embodiments, the resistively heatable layer is further associated with the fifth surface. In other embodiments, the resistively heatable layer is further associated with the sixth surface. In some embodiments, the resistively heatable layer may be operable to inhibit or prevent visible condensation buildup on the sixth surface with a power of less than about 500, 400, 350, 300, 250, 200, 150, 100, 50, or 25 watts per square meter of resistively heatable layer applied to the resistively heatable layer. In some embodiments, the resistively heatable layer may be configured to selectively heat a region only partly occluding a viewing region of the window.

In some embodiments, the window may further comprise a hydrophilic layer. The hydrophilic layer may be associated with the sixth surface.

In some embodiments, the window may further comprise a film. The film may be associated with the fifth surface. The film may have a high emissivity. Accordingly, the film may have an emissivity greater than greater than or equal to about 0.5, 0.6, 0.7, 0.8, 0.9, or 1.0.

In some embodiments, the window may further comprise a dust cover. The dust cover may be disposed interior and in a spaced apart relationship relative the anti-condensation assembly. Additionally, the dust cover may comprise a mechanical shade.

In some embodiments, the window may further comprise a temperature sensor. The temperature sensor may be operable to take a measurement of the temperature of the second chamber, the resistively heatable material, and/or the pressure pane. Further, in such an embodiment, a power applied to the resistively heatable layer may be determined based, at least in part, on the measurement.

According to yet another aspect of the present disclosure, an electro-optic element is disclosed. The electro-optic element may be part of a window assembly. Further, the electro-optic element may comprise a first substrate, a second substrate, a first electrode, a second electrode, an electro-optic medium, and a resistively heatable layer. The first substrate may have a first surface and a second surface. The second substrate may have a third surface and a fourth surface. Further, the second substrate may be disposed in a spaced apart relationship relative the first substrate. The first electrode may be associated with the second surface. The second electrode may be associated with the third surface. The electro-optic medium may be disposed between the first and second electrodes. In some embodiments, the electro-optic medium is electro-chromic. The resistively heatable layer associated with the first surface, the resistively heatable layer operable to dissipate thermal energy when an electrical current is applied thereto.

Some embodiments have the advantage of relocating the condensing surface of the window proximate the electrically conductive material and insulating the condensing surface from an exterior environment. The relocation of the condensation surface may be aided by the one or more seals. Further, the resistively heatable layer may operate to reduce or eliminate the presence of visible moisture on the condensation surface.

According to yet another aspect of the present disclosure, a window assembly may be an aerospace window. Further, the window assembly may include a variably transmissive electro-optic element and an anti-condensation assembly. The anti-condensation assembly may include a first seal disposed in a peripheral manner relative to the variably transmissive electro-optic element. The first seal defines, at least in part, a first chamber and operable to restrict air and moisture from freely entering the first chamber. A resistively heatable layer may be located in the interior direction with respect to the variably transmissive electro-optic element. The resistively heatable layer is operable to dissipate thermal energy when an electrical current is applied.

According to still yet another aspect of the present disclosure, a window assembly may be an aerospace window. Further, the window assembly may include a substantially transparent pressure pane having a first surface and a second surface, the first surface may be disposed in an exterior direction relative the second surface. A variably transmissive electro-optic element may be disposed in an interior direction relative the pressure pane. A dust cover may be located in the interior direction with respect to the variably transmissive electro-optic element. A resistively heatable layer may be located in the exterior direction with respect to the dust cover. The resistively heatable layer is operable to dissipate thermal energy when an electrical current is applied.

According to still another aspect of the present disclosure, a window assembly may be an aerospace window. Further, the window assembly may include a variably transmissive electro-optic element and a dust cover that is located in the interior direction with respect to the variably transmissive electro-optic element. An anti-condensation assembly may include a resistively heatable layer located in the exterior direction with respect to the dust cover and a hydrophilic layer coupled to the resistively heatable layer. The resistively heatable layer is operable to dissipate thermal energy when an electrical current is applied.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features in other embodiments.

DETAILED DESCRIPTION

Figure 1:
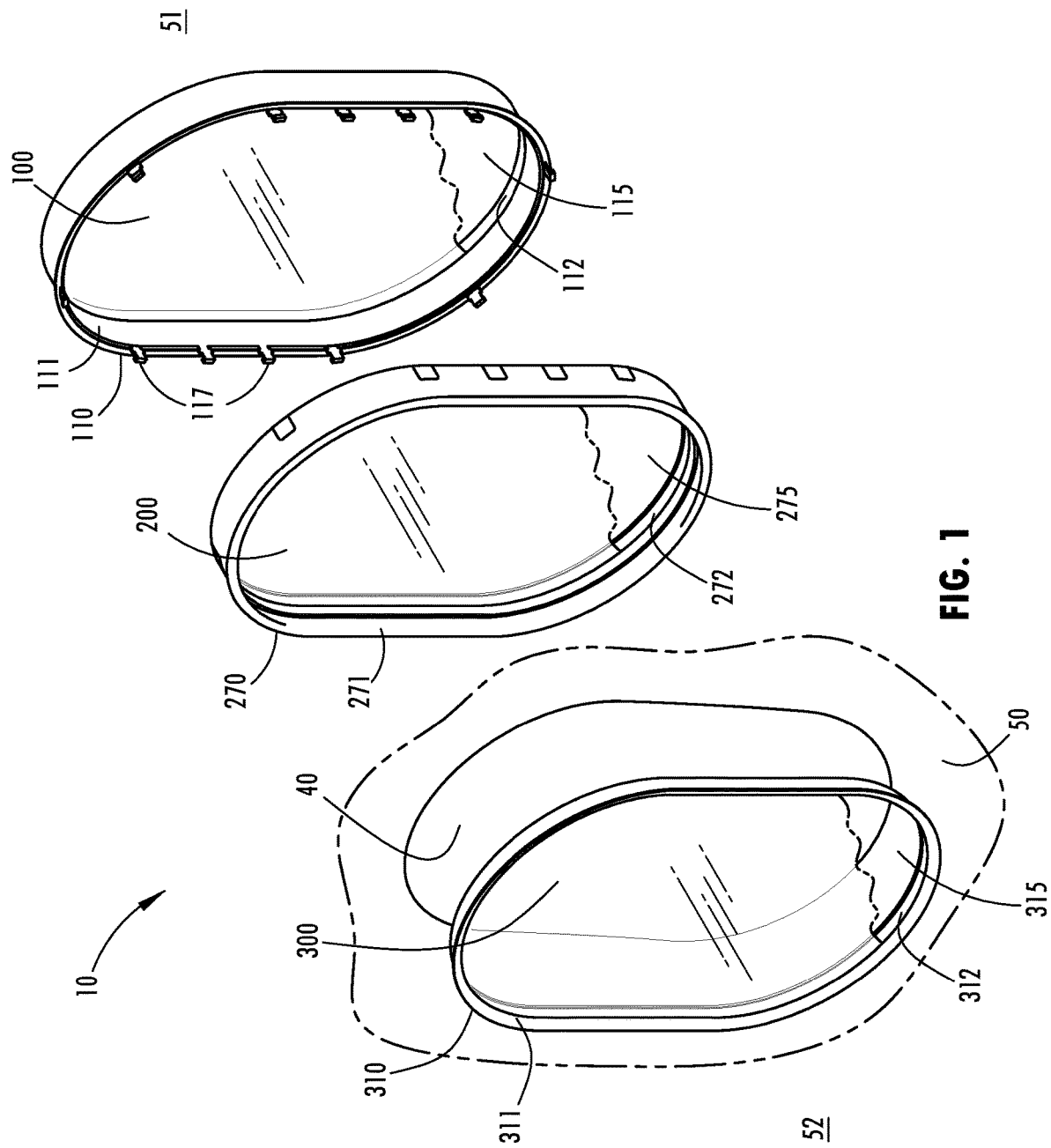
FIG. 1: An exploded view of an aerospace window assembly.

For the purposes of description herein, it is to be understood that the specific devices illustrated in the attached drawings and described in this disclosure are simply exemplary embodiments of the inventive concepts defined in the appended claims. Hence, specific dimensions and other physical characteristics relating the embodiments disclosed herein are not limiting, unless the claims expressly state otherwise.

The present disclosure is directed to a heated aircraft window that inhibits or prevents visible condensation from obstructing a passenger's field of view from within the aircraft. The visible condensation may be in the form of frost. Accordingly, FIGS. 1-8 illustrate an aerospace window assembly 10. Aerospace window assembly 10 may comprise one or more of a pressure pane (PP) 100, an electro-optic element 200, and a dust cover 300. In some embodiments, aerospace window assembly 10 is fit into an open aperture 40 of an aircraft fuselage 50, between an exterior 51 and an interior 52.

Pressure pane 100 comprises an exterior surface 101 and an interior surface 102. Further, pressure pane 100 may be planar or non-planar. Pressure pane 100 may be fabricated from any one of a number of materials that are transparent or substantially transparent in the visible region of the electromagnetic spectrum, such as stretched acrylic, boroaluminosilicate ("BAS") glass; polycarbonate, such as Pro-Lens® polycarbonate, commercially available from Professional Plastics, which may be hardcoated; polyethylene terephthalate, such as Spallshield® CPET available from Kuraray®; Opticor™, commercially available from PPG®;

soda lime glass; float glass; natural and synthetic polymeric resins; plastics; and/or composites. While particular substrate materials are disclosed, numerous other substrate materials may likewise be used-so long as the materials are at least substantially transparent and exhibit appropriate physical properties for strength and tolerance to conditions of the device's environment, such as ultra-violet light exposure from the sun and temperature extremes. Additionally, pressure pane 100 may be comprised of a singular or a plurality of laminated substrates. Further, pressure pane 100 may be operable to maintain a pressure differential between exterior 51 and interior 52 of aircraft fuselage 50 while providing a passenger with a view therethrough. In some embodiments, interior surface 102 may be associated with a hydrophilic layer.

In some embodiments, pressure pane 100 may be disposed in a first frame 110. First frame 110 defines a first opening 115 further defining a first inner surface 111. First inner surface 111 may comprise a first channel 112. Accordingly, first frame 110 may be disposed about a periphery 103 of pressure pane 100 such that periphery 103 is in abutting contact with first frame 110. Periphery 101 may further be disposed in first channel 112. In some further embodiments, first frame 110 may also comprise a plurality of connectors 117.

Figure 2:
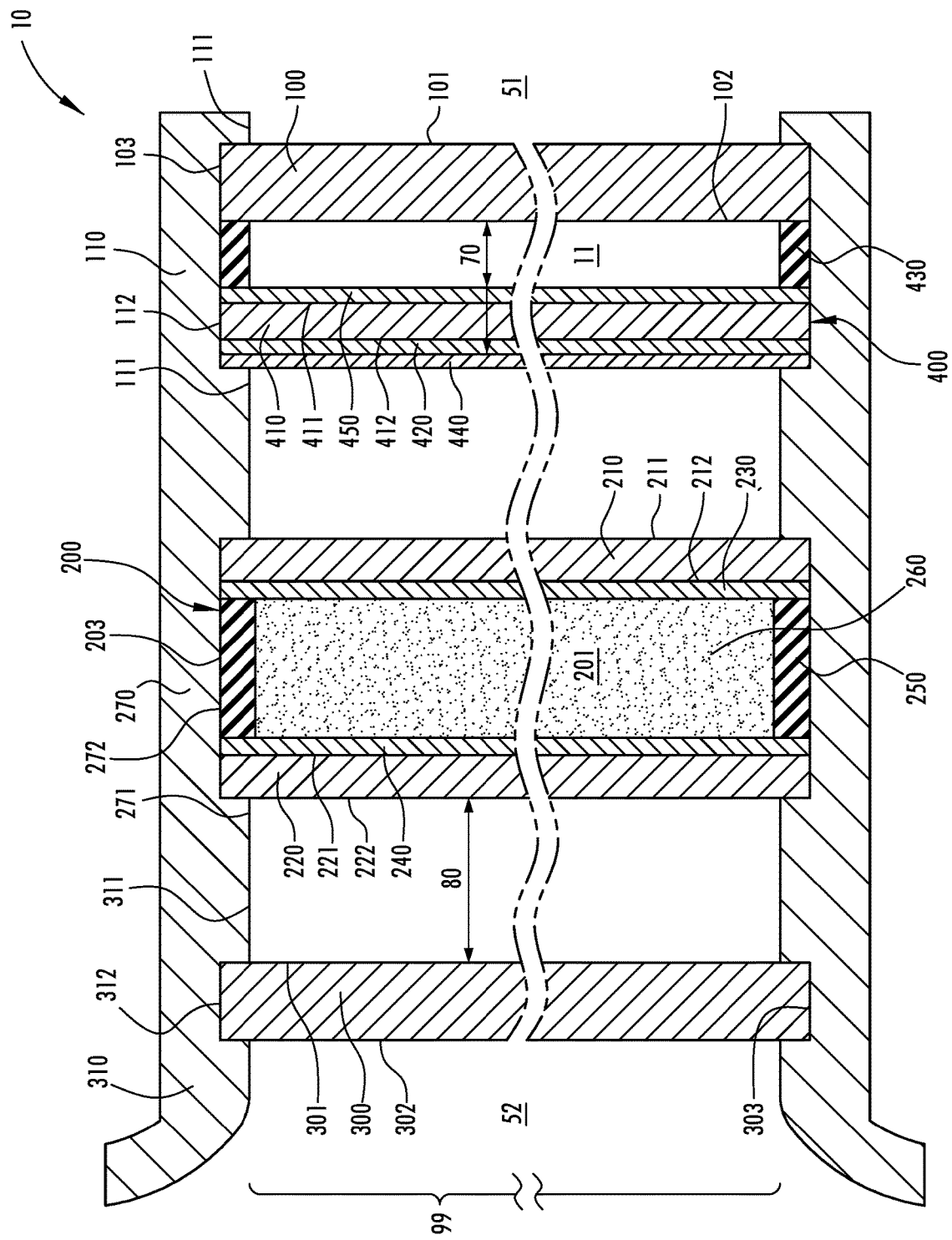
FIG. 2: Cross-sectional schematic of an aerospace window assembly.

Additionally, as shown in FIG. 2, in some embodiments, pressure pane 100 may be associated with an anti-condensation assembly (ACA) 400. Anti-condensation assembly 400 may be disposed in an interior direction relative pressure pane 100. Further, anti-condensation assembly (ACA) 400 may comprise an ACA substrate 410, a resistively heatable material 420, and/or a PP seal 430. Additionally, anti-condensation assembly 400 may be planar or non-planar. In some further embodiments, anti-condensation assembly 400 may further comprise a hydrophilic layer 440. Anti-condensation assembly 400 may additionally be disposed in frame 110. Moreover, anti-condensation assembly 400 may be further disposed in channel 112.

ACA substrate 410 is substantially transparent in the visible region of the electromagnetic spectrum and comprises an exterior surface 411 and an interior surface 412. Additionally, ACA substrate 410 may be planar or non-planar. In some embodiments, ACA substrate 410 may be fabricated from similar materials as pressure pane 100. Further, ACA substrate 410 may be disposed interior to and/or in a spaced apart relationship with pressure pane 100. In some embodiments, ACA substrate 410 may be disposed less than or approximately equal to 20, 15, 10, 9, 8, 7, 6, 5, 4, 3, 2, or 1 mm from pressure pane 100.

Resistively heatable material 420 may be any material substantially transparent in the visible region of the electromagnetic spectrum and operable to dissipate thermal energy when an electrical current is applied thereto. The energy dissipated may be heat. In other words, resistively heatable material 420 may be an electrically conductive material that may operably be resistively heated. Resistively heatable material 420, for example, may be fabricated from a transparent conductive oxide, such as fluorine doped tin oxide, tin doped indium oxide, doped zinc oxide, or other materials known in the art. Additionally, resistively heatable material 420 may have an optical half wave thickness, an optical quarter wave thickness, or other thickness chosen to help optimize the transmitted and/or reflected color. Further, resistively heatable material 420 may be disposed on the exterior 411 and/or interior 412 surfaces of ACA substrate 410 and may even be a sub layer within ACA substrate 410. Accordingly, resistively heatable material 420 may be planar or non-planar.

PP seal 430 may be disposed between pressure pane 100 and ACA substrate 410 and/or resistively heatable material 420 in a peripheral manner to define a first chamber 11 therewith. In some embodiments, PP seal 430 may comprise a material capable of being adhesively bonded with pressure pane 100, ACA substrate 410, and/or resistively heatable material 420. In some embodiments, PP seal 430 may be a seal operable to allow for the transfer of air and other mater into and/or out of first chamber 11. In other embodiments, PP seal 430 may be a hermetic seal operable to seal first chamber 11 from air both of the exterior 51 and the interior 52 of aircraft fuselage 50. In some embodiments, PP seal 430 may be constructed of foam and/or be a part of first frame 110. In some further embodiments, first chamber 11 may substantially be a vacuum or filled with a gas other than air, such as argon, to enhance insulating properties of first chamber 11.

Hydrophilic layer 440 may be any layer substantially transparent in the visible region of the electromagnetic spectrum and operable to inhibit or prevent visible condensation from forming thereon. In some embodiments, hydrophilic layer 440 may inhibit or prevent fogging and/or visible condensation by uniformly dispersing moisture into a thin film. In embodiments where resistively heatable material 420 is associated with interior surface 412 of ACA substrate 410, hydrophilic layer 440 may be associated with resistively heatable material 420. Alternatively, in embodiments where resistively heatable material 420 is not associated with interior surface 412 of ACA substrate 410, hydrophilic layer 440 may be associated with interior surface 412. Accordingly, hydrophilic layer 440 may be planar or non-planar.

Figure 3:
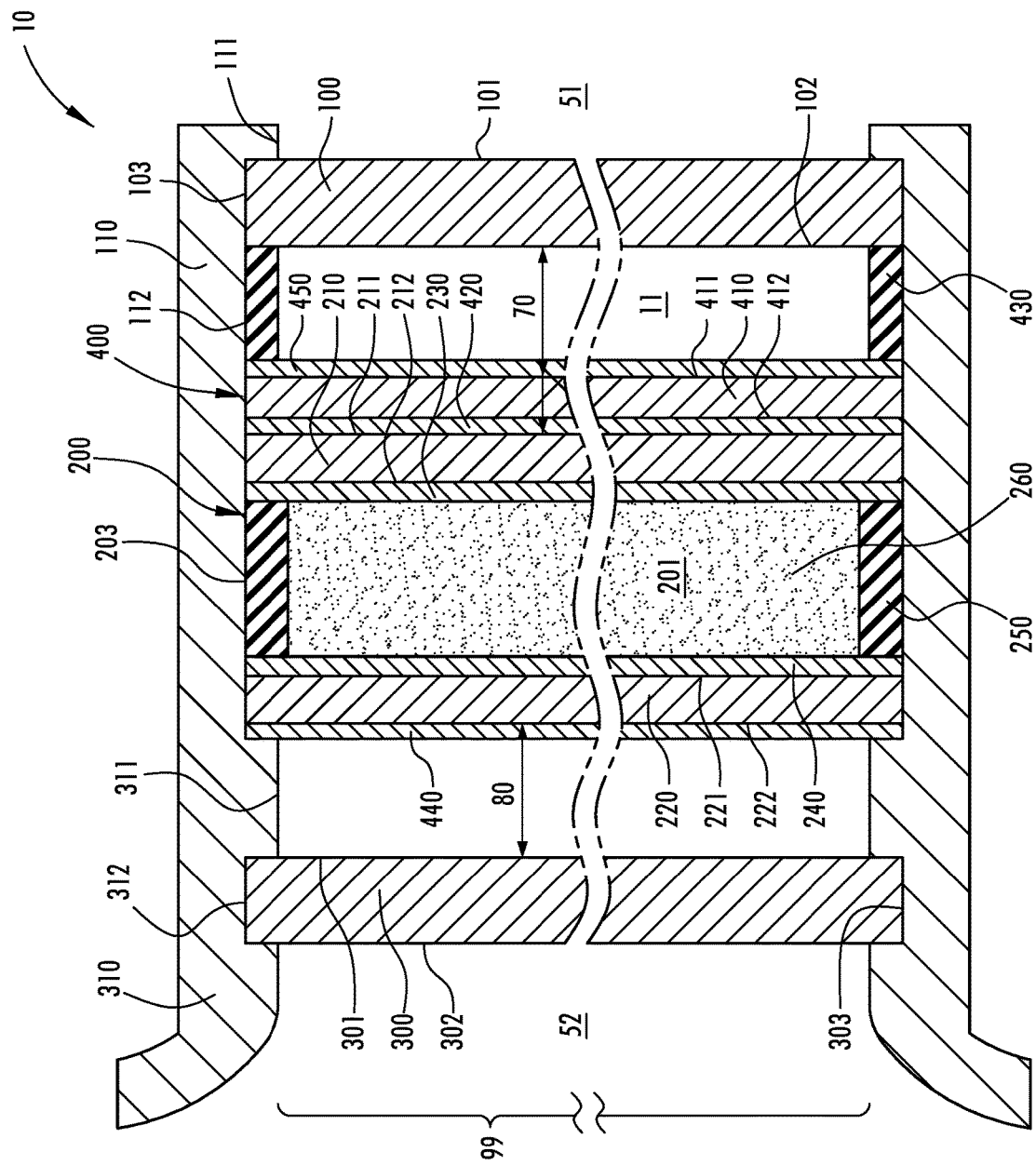
FIG. 3: Cross-sectional schematic of an aerospace window assembly.
Figure 4:
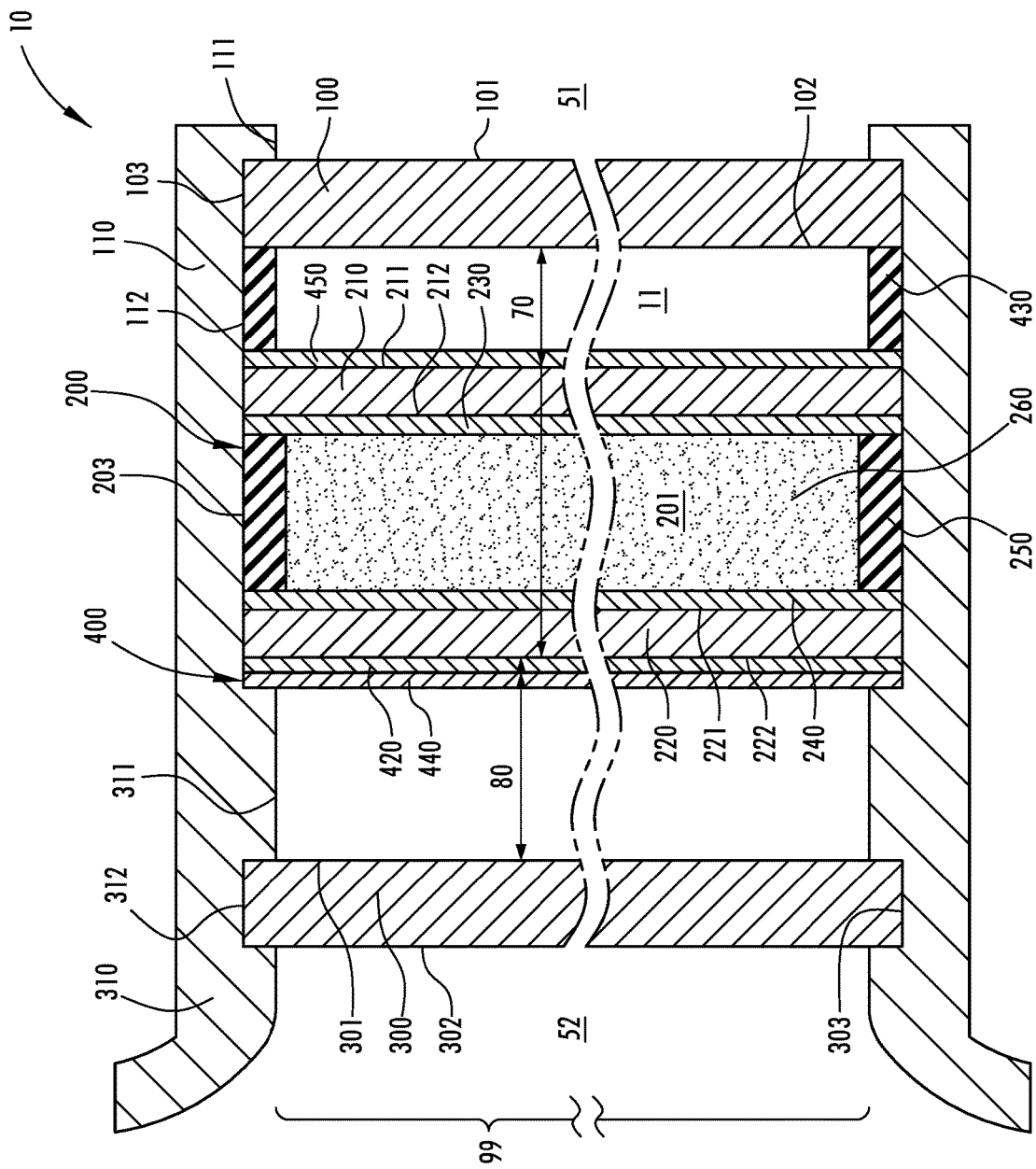
FIG. 4: Cross-sectional schematic of an aerospace window assembly.
Figure 5:
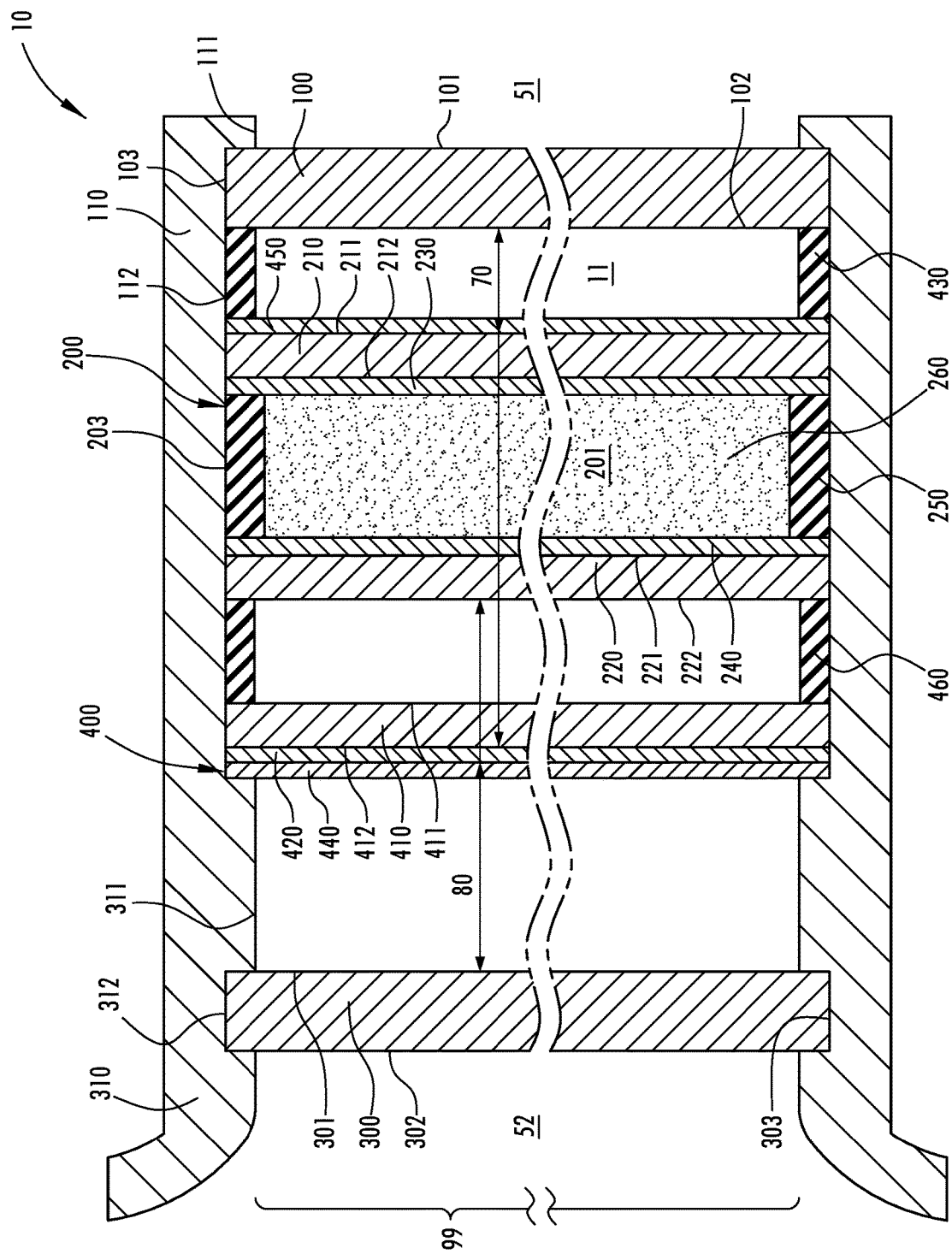
FIG. 5: Cross-sectional schematic of an aerospace window assembly.

Electro-optic (EO) element 200 is variable between states of different light transmissivity and may comprise an exterior EO substrate 210, an interior EO substrate 220, a first electrode 230, a second electrode 240, an EO seal 250, and an electro-optic medium 260. Additionally, electro-optic element 200 may be planar or non-planar. Further, electro-optic element 200 may be disposed such that it is interior, proximate, and substantially parallel relative pressure pane 100. In some embodiments, as shown in FIG. 3, electro-optic element 200 may be disposed such that anti-condensation assembly 400 is disposed between electro-optic element 200 and pressure pane 100. In other embodiments, as shown in FIGS. 4-5, electro-optic element 200 may be disposed between anti-condensation assembly 400 and pressure pane 100. In some embodiments, electro-optic element 200 may be disposed in a second frame 270. Second frame 270 defines a second opening 275 further defining a second inner surface 271. Second inner surface may comprise a second channel 272. Accordingly, second frame 270 may be disposed about a periphery 203 of electro-optic element 200, such that periphery 203 is in abutting contact with second frame 270. Periphery 203 may further be disposed in second channel 272. In some further embodiments, first frame 110 and second frame 270 may be a single frame. Likewise, first inner surface 111 and second inner surface 271 may be a single surface. Furthermore, as shown in FIGS. 3-5, first channel 112 and second channel 272 may be a single channel.

Exterior EO substrate 210 comprises an exterior 211 and an interior surface 212. Further, exterior EO substrate 210 may be fabricated from similar materials as pressure pane 110. Additionally, interior surface 212 of exterior EO substrate 210 may be associated with first electrode 230. First electrode 230 may comprise an electrically conductive material that is substantially transparent in the visible region of the electromagnetic spectrum and generally resistant to corrosion from materials contained within second chamber 201. For example, first electrode 230 may be fabricated from a transparent conductive oxide, such as fluorine doped tin oxide, indium tin oxide, doped zinc oxide, or other materials known in the art.

Interior EO substrate 220 comprises an exterior surface 221 and an interior surface 222. Interior EO substrate 220 may be fabricated from similar materials as exterior EO substrate 210. Additionally, exterior surface 221 of interior EO substrate 220 may be associated with second electrode 240. Second electrode 240 may comprise the same materials as first electrode 230. Further, interior EO substrate 220 is disposed in a substantially parallel and spaced apart relationship with exterior EO substrate 210.

EO seal 250, may be positioned between exterior EO substrate 210 and interior EO substrate 220 in a peripheral manner to define a chamber 201 in combination with the first and second electrodes 230, 240. In some embodiments, EO seal 250 may extend between at least two of interior surface 212 of exterior EO substrate 210, exterior surface 221 of interior EO substrate 220, first electrode 230, and second electrode 240. In some embodiments, the first and second electrodes 230, 240 may be partially removed where EO sealing member 250 is positioned. In other embodiments, EO seal 250 may be disposed about and bridging between the peripheries of exterior 210 and/or interior 220 EO substrates. Further, EO seal 250 may comprise any material capable of being adhesively bonded to at least two of: first electrode 230, second electrode 240, exterior EO substrate 210, and interior EO substrate 220 to in turn seal EO chamber 201, such that species disposed in chamber 201 do not inadvertently leak out. Further, in some embodiments EO seal 250 has low permeabilities for oxygen and moisture vapor, as well as little to no reactivity with species disposed in chamber 201, such as electro-optic medium 260.

Electro-optic medium 260 is disposed in chamber 201. In some embodiments, electro-optic medium 260 comprises a plurality of redox species, where the redox species are at least one anodic material and/or at least one cathodic material. Further, at least one of the redox species may be electrochromic. It will be understood that the term "electrochromic" will be defined herein, regardless of its ordinary meaning, as a material that exhibits a change in its extinction coefficient at one or more wavelengths upon exposure to a particular electrical potential. Accordingly, in such an embodiment, upon application of an electric voltage or potential, the electro-optic medium 260 is activated, producing a change in absorbance at one or more wavelengths of the electromagnetic spectrum, preferably within the visible range. In other words, electro-optic medium 260 may change color when an electrical potential is applied. Further, electro-optic medium 260 may comprise other materials, such as: solvents, light absorbers, light stabilizers, thermal stabilizers, redox buffers, antioxidants, and polymer matrices.

Additionally, in some embodiments, as shown in FIGS. 3-4, electro-optic element 200 may be combined with an anti-condensation assembly 400. Anti-condensation assembly 400 may comprise a resistively heatable material 420. Resistively heatable material 420 may be any material substantially transparent in the visible region of the electromagnetic spectrum and operable to dissipate thermal energy when an electrical current is applied thereto. For example, resistively heatable material 420 may be fabricated from a transparent conductive oxide, such as fluorine doped tin oxide, tin doped indium oxide, doped zinc oxide, or other materials known in the art. Further, resistively heatable material 420 may have a low emissivity. For example, the emissivity may be less than or equal to about 0.5, 0.4, 0.3, 0.2, 0.1, or 0.0.

In some embodiments, as shown in FIG. 3, resistively heatable material 420 may be associated with and/or disposed on exterior surface 211 of exterior EO substrate 210. In such an embodiment, anti-condensation assembly 400 may further comprise an ACA substrate 410. ACA substrate 410 is substantially transparent in the visible region of the electromagnetic spectrum and comprises an exterior surface 411 and an interior surface 412. Interior surface 412 may be associated with and/or disposed on resistively heatable material 420. Accordingly, resistively heatable material 420 may be disposed between exterior EO substrate 210 and ACA substrate 410.

In other embodiments, as shown in FIG. 4, resistively heatable material 420 may be associated with and/or disposed on interior surface 222 of interior EO substrate 220. Accordingly, resistively heatable material 420 may be disposed interior relative electro-optic element 200.

In yet other embodiments, as shown in FIG. 5, anti-condensation assembly 400 may further comprise an ACA substrate 410. ACA substrate 410 may be disposed interior to and spaced apart relationship relative interior EO substrate 220. ACA substrate 410 is substantially transparent in the visible region of the electromagnetic spectrum and comprises an exterior surface 411 and an interior surface 412. In some embodiments, ACA substrate 410 may be fabricated from similar materials as pressure pane 100. Further, resistively heatable material 420 may be associated with interior surface 412 of ACA substrate 410. In such an embodiment, anti-condensation assembly 400 may further comprise an ACA seal 460.

ACA seal 460, as shown in FIG. 5, may be disposed between interior EO substrate 220 and ACA substrate 410 in a peripheral manner to define a third chamber 13 therewith. ACA seal 460 may comprise any material capable of being adhesively bonded with interior EO substrate 220 and ACA substrate 410. In some embodiments, ACA seal 460 may be a seal operable to allow for the transfer of air and other mater into and/or out of third chamber 13. In other embodiments, ACA seal 460 may be a hermetic seal operable to seal third chamber 13 from air both of the exterior 51 and the interior 52 of aircraft fuselage 50. In some embodiments, ACA seal 460 may be constructed of foam and/or be a part of second frame 270. In some further embodiments, third chamber 13 may substantially be a vacuum or filled with a gas other than air, such as argon, to enhance insulating properties of third chamber 13.

Figure 6:
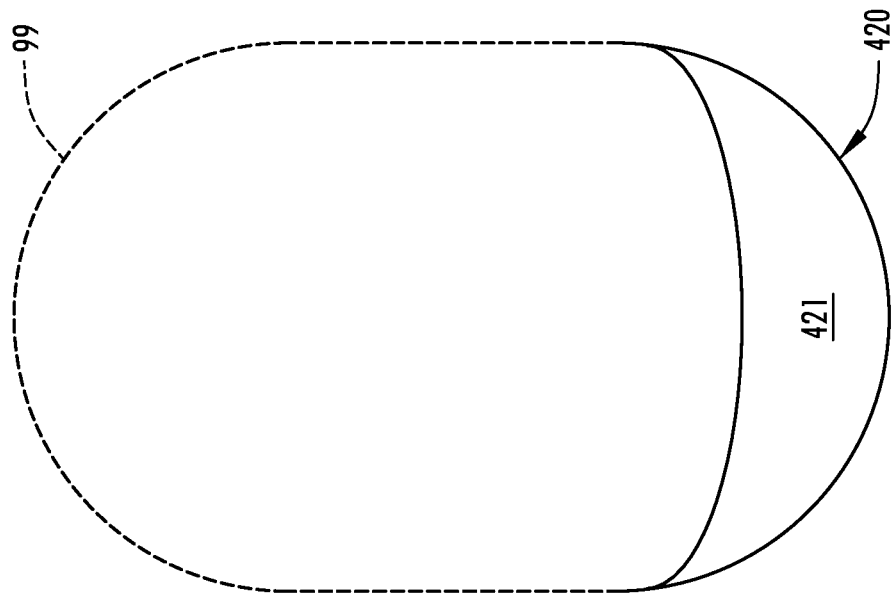
FIG. 6: Schematic representation of an electrically conductive material defining a single heating region.

In some embodiments, anti-condensation assembly 400 may further comprise hydrophilic layer 440. Hydrophilic layer 440 may be any layer substantially transparent in the visible region of the electromagnetic spectrum and operable to uniformly distribute water across or inhibit or prevent visible condensation from forming thereon. In embodiments where resistively heatable material 420 is disposed on and/or associated with exterior surface 211 of exterior EO substrate 210, as shown in FIG. 3, hydrophilic layer 440 may be associated with and/or disposed on interior surface 222 of interior EO substrate 220. In embodiments where resistively heatable material 420 is associated with and/or disposed on interior surface 222 of interior EO substrate 220, as shown in FIG. 5, or is associated with and/or disposed on interior surface 412 of ACA substrate 410, as shown in FIG. 6, hydrophilic layer 440 may be associated with and/or disposed on resistively heatable material 420. Alternatively, in other embodiments where resistively heatable material 420 is not associated with interior surface 412 of ACA substrate 410, hydrophilic layer 440 may be disposed on and/or associated with interior surface 412 of ACA substrate 410.

In some embodiments, anti-condensation assembly 400 may further comprise a high emissivity surface 450. In some embodiments, high emissivity surface 450 may be a NIR reflecting film, such as Crystalline CR90 by 3M®. Accordingly, high emissivity surface 450 may be a coating, film, or member substantially transparent in the visible region and substantially reflective in the infra-red and/or near infra-red regions of the electromagnetic spectrum. High emissivity surface 450 may be disposed on and/or associated with exterior surface 411 of ACA substrate 410, as shown in FIG. 3, or disposed on and/or associated with exterior surface 211 of exterior EO substrate 210, as shown in FIG. 4. Additionally, high emissivity surface 450 may have a high emissivity. For example, the emissivity may be greater than or equal to about 0.5, 0.6, 0.7, 0.8, 0.9, or 1.0.

In some embodiments, as shown in FIG. 5, anti-condensation assembly 400 may further comprise a PP seal 430. PP seal 430 may be disposed between pressure pane 100 and exterior EO substrate 210 and/or high emissivity surface 450 in a peripheral manner to define first chamber 11 therewith. In some embodiments, PP seal 430 may comprise a material capable of being adhesively bonded with pressure pane 100, exterior EO substrate 210, and/or high emissivity surface 450. In some embodiments, PP seal 430 may be a seal operable to allow for the transfer of air and other mater into and/or out of first chamber 11. In other embodiments, PP seal 430 may be a hermetic seal operable to seal first chamber 11 from air both of the exterior 51 and the interior 52 of aircraft fuselage 50. In some embodiments, PP seal 430 may be constructed of foam and/or be a part of first frame 110. In some further embodiments, first chamber 11 may substantially be a vacuum or filled with a gas other than air, such as argon, to enhance insulating properties of first chamber 11.

In some embodiments, one or more elements may be disposed a distance 70 from pressure pane 100. Accordingly, anti-condensation assembly 400 may be disposed the distance 70 from pressure pane 100. In such an embodiment, distance 70 may be defined by a distance between heating element 420 or exterior surface 411 of ACA substrate 410 and interior surface 102 of pressure pane 100. In other embodiments, electro-optic element 200 may be disposed the distance 70 from pressure pane 100. In such an embodiment, distance 70 may be defined by a distance between exterior surface 211 of exterior EO substrate 210 and interior surface 102 of pressure pane 100. In some embodiments, distance 70 may be equal to or less than about 25, 20, 15, 10, 9, 8, 7, 6, 5, 4, 3, 2, or 1 mm.

Dust cover 300 comprises an exterior surface 301 and an interior surface 302. Dust cover 300 may be comprised of a single or a plurality of substrates. In some embodiments, dust cover 300 may additionally comprise a mechanical shade. Further, dust cover 300 may be disposed substantially parallel to and in a spaced apart relationship with electro-optic element 200 such that electro-optic element 200 is disposed between dust cover 300 and pressure pane 100. Accordingly, dust cover 300 is operable to provide a protective barrier between electro-optic element 200 and interior 52 of the aircraft fuselage 50, and to resist breaking and maintain sufficient rigidity to inhibit the electro-optic element 200 from breaking when a force is applied to dust cover 300 in a direction of electro-optic element 200. Additionally, dust cover 300 may be fabricated from any one of a number of materials that are transparent or substantially transparent in the visible region of the electromagnetic spectrum. For example, dust cover 300 may comprise boroaluminosilicate ("BAS") glass; polycarbonate, such as Pro-Lens® polycarbonate, commercially available from Professional Plastics, which may be hardcoated; polyethylene terephthalate, such as but not limited to Spallshield® CPET available from Kuraray®; soda lime glass; float glass; strengthened glass; natural and synthetic polymeric resins; plastics; and/or composites. While particular substrate materials are disclosed, numerous other substrate materials may likewise be used-so long as the materials are at least substantially transparent and exhibit appropriate physical properties for strength and tolerance to conditions of the device's environment, such as temperature extremes and ultra-violet light exposure from the sun.

In some embodiments, dust cover 300 may be disposed in a third frame 310. Third frame 310 defines a third opening 315 further defining a third surface 311. Third surface 311 may comprise a third channel 312. Accordingly, third frame 310 may be disposed about a periphery 303 of dust cover 300, such that periphery 303 is in abutting contact with the third frame 310. Periphery 303 may further be disposed in third channel 312. In some further embodiments, third frame 310, second frame 270, and first frame 110 may be a single frame. Likewise, third inner surface 311, second inner surface 271, and first inner surface 111 may be a single surface.

In some embodiments, one or more elements may be disposed a distance 80 from dust cover 300. In some embodiments, dust cover 300 may be disposed a distance 80 from electro-optic element 200. In such an embodiment, distance 80 may be defined by a distance between interior surface 222 of interior EO substrate 220 and exterior surface 301 of dust cover 300. In other embodiments, dust cover 300 may be disposed a distance 80 from anti-condensation assembly 400. In such an embodiment, distance 80 may be defined by a distance between resistively heatable material 420 of anti-condensation assembly 400 and exterior surface 301 of dust cover 300. In some embodiments, distance 80 may be substantially greater than distance 70. Distance 80, for example, may be equal to or less than about 60, 55, 50, 45 40, 35, 30, 25, 20, 15, 10, or 5 mm.

In some embodiments, aerospace window assembly 10 may be disposed within an open aperture 40 of an aircraft fuselage 50, such that pressure pane 100 is directed to the exterior 51 of aircraft fuselage 50. Further, plurality of connectors 117 may be operable to secure pressure pane 100 to aircraft fuselage 50.

Figure 7:
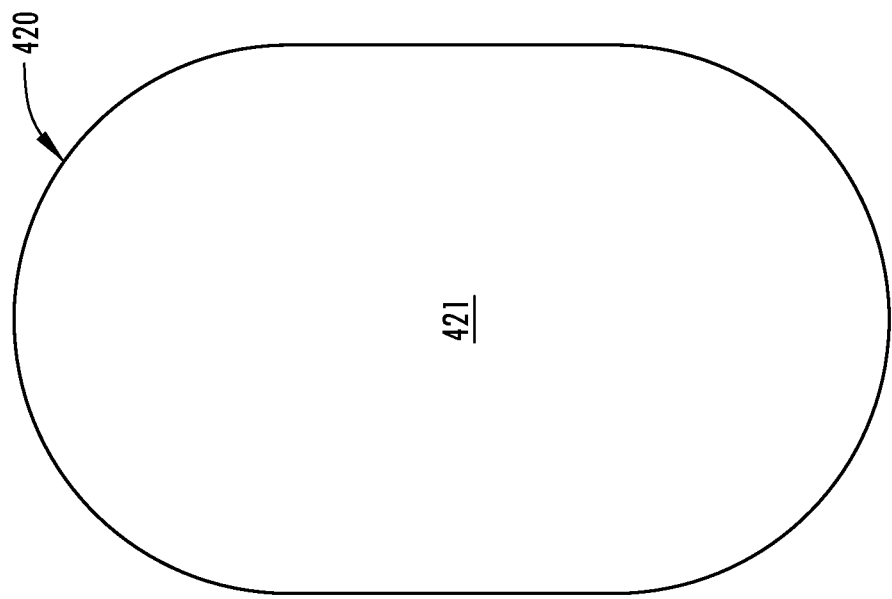
FIG. 7: Schematic representation of an electrically conductive material that only partially occludes a viewing region.
Figure 8:
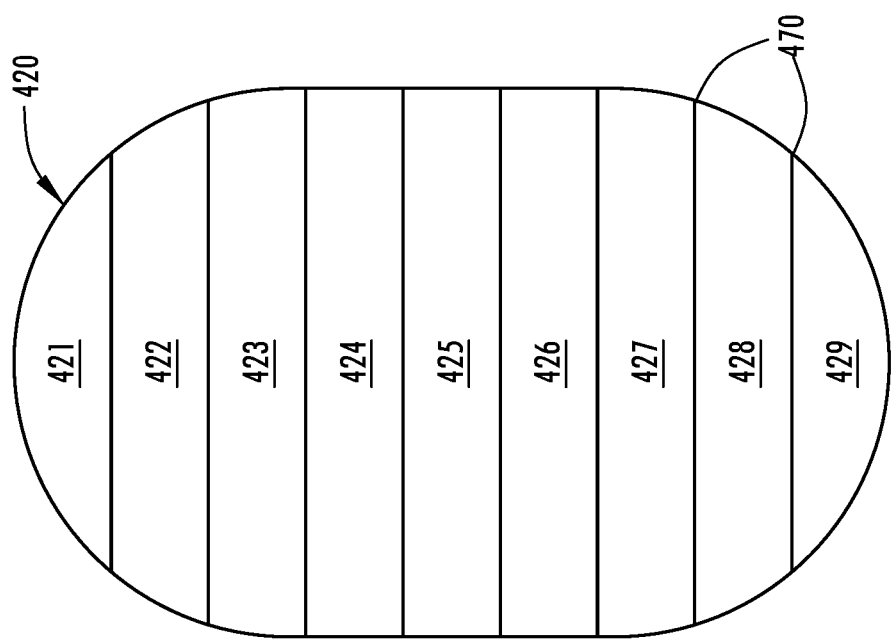
FIG. 8: Schematic representation of an electrically conductive material defining a plurality of heating regions.

Additionally, as shown in FIGS. 6-8, in some embodiments, anti-condensation assembly 400 may be configured to independently heat at one or more heating regions 421-429. Anti-condensation assembly 400 may have any number of heating regions 421-429. Additionally, in some embodiments, resistively heatable material 420 may be applied in a gradient across one or more heating regions 421-429.

In embodiments where anti-condensation assembly 400 is configured to heat at one heating region 421, heating region 421 may be substantially occluding the entire aperture 40 or viewing region 99 of aerospace window assembly 10, as shown in FIG. 6. Viewing region 99 of aerospace window assembly 10 may defined by the interior of the first, second, and/or third openings 115, 275, 315. Additionally, heating region 421 may be defined by resistively heatable material 420. Accordingly, resistively heatable material 420 may be deposited across an entire surface of a substrate, such as ACA substrate 410 or interior EO substrate 220. Alternatively, heating region 421 may only partially occlude aperture 40 or viewing region 99, as shown in FIG. 7. In such an embodiment, resistively heatable material 420 may be deposited across only part of a surface of a substrate to define heating region 421. Alternatively, resistively heatable material 420 may be deposited across an entire surface of ACA substrate 410, where ACA substrate 410 only partially occludes aperture 40 or viewing region 99.

In embodiments where anti-condensation assembly 400 is configured to heat at a plurality of heating regions 421-429, as shown in FIG. 8, heating regions 421-429, may be defined by one or more ablation lines 470. Ablation line 470 may be a line where resistively heatable material 420 is not present. Accordingly, ablation line 470 may serve to electrically isolate a heating region 421-429.

Figure 9:
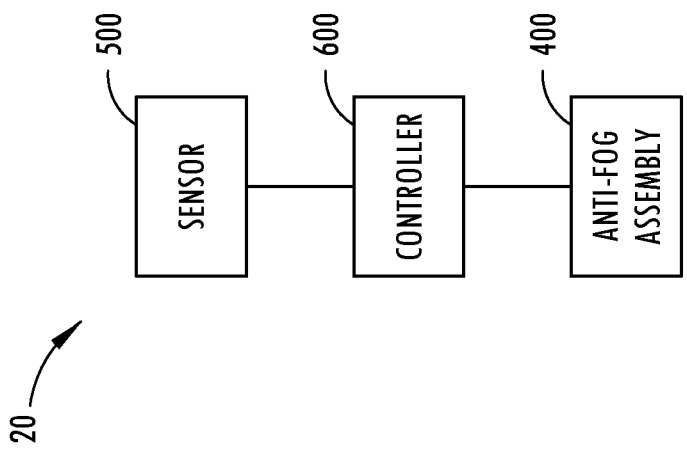
FIG. 9: A schematic representation of an anti-condensation assembly control system.

Additionally, as shown in FIG. 9, in some embodiments, anti-condensation assembly 400 may be a part of a control system 20. Control system 20 may comprise anti-condensation assembly 400, one or more sensor 500, and a controller 600.

Sensor 500 may be a temperature sensor and/or a light sensor operable to collect a measurement related to aerospace window assembly 10. Further, sensor 500 may be disposed such that the measurement is with respect to one or more of pressure pane 100, interior surface 102, first chamber 11, ACA substrate 410, exterior EO substrate 210, second chamber 201, interior EO substrate 220, third chamber 13, and dust cover 300.

Controller 600 is communicatively connected to sensor 500 and anti-condensation assembly 400. Communicatively connected may mean directly connected or indirectly connected through one or more component. Controller 600 may comprise a memory and a processor. The memory may be operable to store one or more power algorithm. The power algorithm, for example, may be operable to determine an appropriate power level to be supplied to resistively heatable material 420 at one or more heating regions 421-429 based at least in part on the measurement. The processor is operable to execute the driver analysis algorithm.

In operation, aerospace window assembly 10 is operable to provide a passenger positioned interior 52 aircraft fuselage 50 with a view of exterior 51. Further, an electrical potential may be applied to resistively heatable material 420 to heat anti-condensation assembly 400 and thereby reduce or substantially eliminate the presence of condensation on one or more of pressure pane 100, ACA substrate 410, exterior EO substrate 210, and interior EO substrate 220, or condensation that is otherwise in a passenger's field of view. The electrical power applied to resistively heatable material 420 may be less than or equal to about 500, 400, 350, 300, 250, 200, 150, 100, 50, or 25 Watts per square meter of resistively heatable material 420.

Some embodiments have the advantage of a small distance between pressure pane 100 and anti-condensation assembly 400, thereby allowing for increased distance between resistively heatable material 420 and other devices, such as dust cover 300. Accordingly, the present disclosure may more effectively reduce or eliminate the buildup of condensation on pressure pane 100 or in a passenger's field of view. Further, the power and resulting heat required to eliminate or reduce condensation on aircraft window assembly 100 is significantly reduced, saving energy and reducing potential damage to other devices, such as dustcover 300.

Some embodiments have the advantage of relocating the condensing surface from interior surface 102 of pressure pane 100 to anti-condensation assembly 400. In various embodiments, the condensation surface may be moved to or proximate resistively heatable material 420, hydrophilic layer 440, or interior surface 412 of ACA substrate 410. The relocation of the condensation surface may be aided by a hermetic PP seal 430 and/or ACA seal 460. PP seal 430 eliminates the permeability of air and moisture into first chamber 11, thereby eliminating or reducing the buildup of condensation on pressure pane 100 and/or anti-condensation assembly 400. Further, embodiments comprising ACA seal 460 eliminate the permeability of air and moisture into third chamber 13, thereby eliminating or reducing the buildup of condensation on exterior EO substrate 220 and/or ACA substrate 410. Accordingly, the condensation surface may be moved interior 52 relative these elements Some embodiments also have the advantage of superior heat allocation via high emissivity surface 450 disposed between pressure pane 100 and electro-optic element 200. In some embodiments, high emissivity surface 450 may be achieved by a NIR reflecting film. The NIR reflecting film, may serve to limit the heating of the interior 52 and/or the aerospace window assembly 10 interior relative the NIR reflecting film from solar energy. For example, NIR reflecting film may serve to reduce the total heat exposure to electro-optic element 200 and/or dust cover 300. Further, the NIR reflecting film may also have the benefit of heating pressure pane 100 by reflecting the additional energy thereto.

Likewise, some embodiments also have the advantage of superior heat allocation via a resistively heatable material 420 having a low emissivity. The low emissivity resistively heatable material 420 may be exterior relative dust cover 300 and accordingly may help to reduce energy transfer to dust cover 300, which may have heat sensitive componentry.

Lastly, some embodiments have the advantage of superior electro-optic element 200 operation. Specifically, heat from resistively heatable material 420 may inhibit electro-optic medium 260 from getting too cold due to surrounding environment by increasing the operating temperature of electro-optic element 200. Electro-optic medium 260 may be heated to an operating temperature that is at 30° C. or higher. This increased operating temperature may result in increased speed of activation and/or deactivation.

In this document, relational terms, such as "first" and "second," "interior" and "exterior," and the like, are used solely to distinguish one entity from another entity, without necessarily requiring or implying any actual such relationship, order, or amount of such entities.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

For purposes of this disclosure, the term "associated" generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "substantially," and variations thereof, will be understood by persons of ordinary skill in the art as describing a feature that is equal or approximately equal to a value or description. For example, a "substantially planar" surface is intended to denote a surface that is planar or approximately planar. Moreover, "substantially" is intended to denote that two values are equal or approximately equal. If there are uses of the term which are not clear to persons of ordinary skill in the art, given the context in which it is used, "substantially" may denote values within about 10% of each other, such as within about 5% of each other, or within about 2% of each other.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. A window assembly comprising:
   a variably transmissive electro-optic element; and
   an anti-condensation assembly comprising:
      a first seal disposed in a peripheral and spaced manner relative to the variably transmissive electro-optic element, the first seal defining, at least in part, a first chamber and operable to restrict air and moisture from freely entering the first chamber, and
      a resistively heatable layer located in the exterior direction with respect to the variably transmissive electro-optic element and an interior direction with respect to the first seal, the resistively heatable layer operable to dissipate thermal energy when an electrical current is applied.

2. The window assembly of claim 1, wherein the variably transmissive electro-optic element comprises:
   a substantially transparent exterior EO substrate and a substantially transparent interior EO substrate, the interior EO substrate disposed in the interior direction and in a spaced apart relationship relative the exterior EO substrate;
   an electro-optic medium disposed between the exterior EO substrate and the interior EO substrate; and
   wherein the resistively heatable layer is coupled to the exterior EO substrate.

3. The window assembly of claim 2, further including a hydrophilic layer coupled to the interior EO substrate.

4. The window assembly of claim 2, wherein the resistively heatable layer is located on an ACA substrate.

5. The window assembly of claim 4, further including a pressure pane on an exterior direction with respect to the variably transmissive electro-optic element, the first seal located between the ACA substrate and the pressure pane defining the first chamber.

6. The window assembly of claim 5, wherein the first chamber is defined by a distance between the ACA substrate and the pressure pane, the distance being equal to or less than 10 mm.

7. The window assembly of claim 2, wherein the resistively heatable layer is located on an exterior surface of the exterior EO substrate.

8. The window assembly of claim 2, further including a high emissivity surface located on the ACA substrate.

9. The window assembly of claim 8, wherein the high emissivity surface includes an NIR reflective film.

10. The window assembly of claim 8, wherein the resistively heatable layer is located between the ACA substrate and the variably transmissive electro-optic element.

11. The window assembly of claim 10, wherein the resistively heatable layer is located on an interior surface of the ACA substrate.

12. The window assembly of claim 2, further including a hydrophilic layer coupled to an interior surface of the interior EO substrate.

13. The window assembly of claim 1, further including a dust cover located in the interior direction with respect to the variably transmissive electro-optic element.

14. A window assembly comprising:
   a substantially transparent pressure pane having a first surface and a second surface, the first surface disposed in an exterior direction relative the second surface;
   a variably transmissive electro-optic element disposed in an interior direction relative the pressure pane;
   a dust cover located in the interior direction with respect to the variably transmissive electro-optic element;
   a resistively heatable layer located in the exterior direction with respect to the dust cover, the resistively heatable layer operable to dissipate thermal energy when an electrical current is applied; and
   a substantially transparent first substrate having a third surface and a fourth surface, the third surface disposed in the exterior direction relative the fourth surface, the first substrate disposed in a spaced apart relationship with the pressure pane and located in the exterior direction with respect to the variably transmissive electro-optic element.

15. The window assembly of claim 14, further including a first seal disposed in a peripheral manner between the pressure pane and the first substrate, the first seal defining, at least in part, a first chamber and operable to restrict air and moisture from freely entering the first chamber.

16. The window assembly of claim 15, further including a second chamber disposed between the variably transmissive electro-optic element and the dust cover.

17. The window assembly of claim 14, wherein the first chamber is defined by a distance between the first substrate and the pressure, the distance being equal to or less than 20 mm.

18. The window assembly of claim 17, wherein the distance is equal to or less than 8 mm.

19. The window assembly of claim 18, wherein the resistively heatable layer is located between the first substrate and the variably transmissive electro-optic element.

20. A window assembly comprising:
   a variably transmissive electro-optic element;
   a dust cover located in an interior direction with respect to the variably transmissive electro-optic element;
   a pressure pane located in an exterior direction with respect to the variably transmissive electro-optic element and
   an anti-condensation assembly comprising:
      a resistively heatable layer located in the exterior direction with respect to the dust cover and the variably transmissive electro-optic element, the resistively heatable layer operable to dissipate thermal energy when an electrical current is applied; and
      a first chamber located in an exterior direction of the variably transmissive electro-optic element and operable to restrict air and moisture from freely entering the first chamber, the first chamber extending a distance between the interior and exterior directions a distance being equal to or less than 15 mm.

* * * * *